United States Patent

[11] 3,568,699

[72] Inventors Peter Bauer
Germantown;
William R. Mentzer, Jr., Silver Spring, Md.

[21] Appl. No. 777,695
[22] Filed Nov. 21, 1968
[45] Patented Mar. 9, 1971
[73] Assignee Bawles Engineering Corporation
Silver Spring, Md.
Continuation-in-part of application Ser. No. 771,758, Oct. 30, 1968.

[54] LEADING AND/OR TRAILING EDGE PULSE SHAPER
14 Claims, 1 Drawing Fig.

[52] U.S. Cl. .......... 137/81.5
[51] Int. Cl. .......... F15c 1/12
[50] Field of Search .......... 137/81.5; 235/201, (p.f.), (sens.), (gen.), (m.e.), 200

[56] References Cited

UNITED STATES PATENTS

| | | | |
|---|---|---|---|
| 3,075,548 | 1/1963 | Horton | 137/81.5X |
| 3,191,860 | 6/1965 | Wadey | 137/81.5X |
| 3,232,305 | 2/1966 | Groeber | 137/81.5 |
| 3,266,510 | 8/1966 | Wadey | 137/81.5 |

OTHER REFERENCES

" Fluid Oscillator," A. E. Mitchell, I.B.M. Technical Disclosure Bulletin, Vol. 5, No. 6, Nov., 1962, p. 25, (copy in Scien. Lib. & Gp. 362, 137— 815)

*Primary Examiner*—Samuel Scott
*Attorney*—Hurvitz, Rose and Greene

ABSTRACT: A simple three element fluidic leading edge and/or trailing edge pulse shaper is supplied which in response to an input signal pulse of predetermined duration produces a sharp pressure pulse at the leading edge of the input signal pulse but does not produce a pulse at the trailing edge of the input pressure pulse.

PATENTED MAR 9 1971 3,568,699
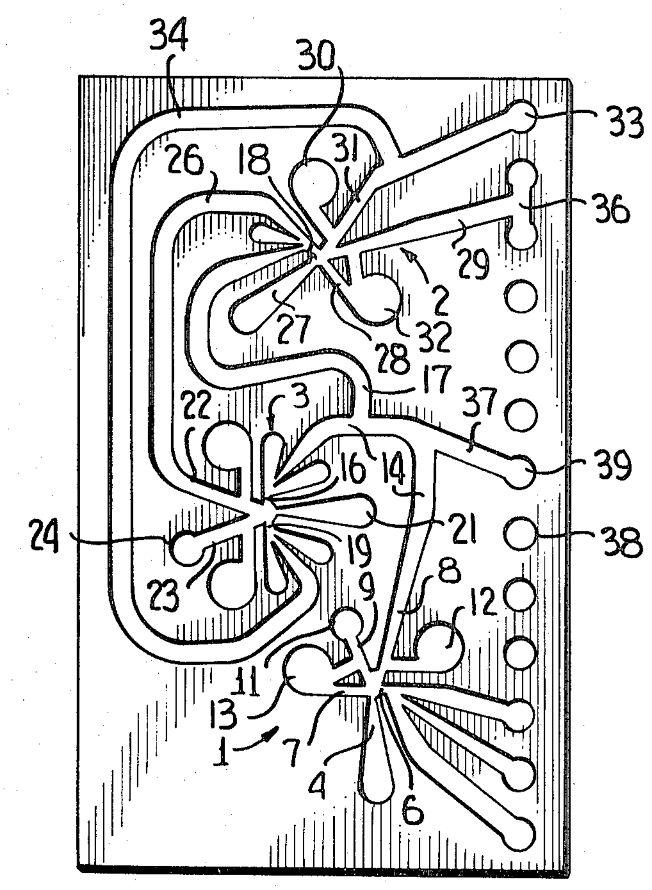
INVENTORS
PETER BAUER &
WILLIAM R. MENTZER, Jr.
BY Hurvitz, Rose & Greene
ATTORNEYS

LEADING AND/OR TRAILING EDGE PULSE SHAPER

This application is a continuation-in-part of copending application Ser. No. 771,758, filed Oct. 30, 1968 in the names of the present inventors.

BACKGROUND OF THE INVENTION

There has been need for some time in fluidic systems for a relatively simple circuit for providing a pulse of predetermined length and amplitude at the beginning and only at the beginning of or at the end of and only at the end of an input control pulse. The need for such circuits often arises in driving counters and initiating controls in industrial or commercial applications where in order to insure reliable operation, it is highly desirable to initiate or terminate operations in response to a pulse of a fixed predetermined amplitude and duration. The prior art circuits employed for such purposes have suffered from one or two difficulties; namely, the production of a specified amplitude pulse of a predetermined duration required complex circuits and pulses were produced at both the beginning and ending of the input control pulse. This latter difficulty with many of the prior art circuits often produced erroneous functions, particularly where counters or related devices were being driven.

SUMMARY OF THE INVENTION

In accordance with the present invention there is provided a relatively simple fluidic circuit employing two monostable devices and a flip-flop, which devices are interlocked to assure the production of only a single output pulse in response to the application of an input control pulse, the former pulse being only in the case of a leading edge shaper of a predetermined amplitude and duration. The input control pulse in the leading edge application is initially coupled to a monostable device which upon initiation of the input pulse permits a second monostable device to switch from its unstable to its stable state. Feedback from the second monostable device through the flip-flop, switches the second monostable device back to its unstable state and retains it there. The delay between the switching of the second monostable device from its unstable to its stable state and then back to its unstable state is determined wholly by the delays through the various channels and the flip-flop of the circuit, and thus the output pulse is of a specified duration and of an amplitude determined by the supply pressure to the second monostable device. The feedback channel from the flip-flop to the second monostable device has the same function on the second monostable device as the first monostable device in the absence of an input control pulse, thus continuation of the input control pulse for any length of time which is greater than that required for the second monostable device to cycle, has no further effect upon the circuit. Thus it is insured that only a single pulse is generated in response to an input pulse.

For a trailing edge shaper, the positive input pulse is employed as control in place of the output signal from the first monostable device. Thus an inverse operation is provided resulting in a trailing edge pulse output.

It is an object of the present invention to provide a shaper circuit capable of operation as a leading edge on a trailing edge pulse shaper and in either mode of operation produces only a single pulse.

It is another object of the present invention to provide a fluidic circuit capable of producing a leading edge or trailing edge pulse shaper in response to an input pulse, the leading or trailing edge pulse being of a predetermined amplitude and duration which is the same in both instances.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawing, wherein:

The single FIGURE is a circuit diagram of the leading edge, pulse shaper of the present invention.

DESCRIPTION OF THE PREFERRED EMBODIMENTS

Referring now specifically to the single FIGURE of the accompanying drawing, there is provided a circuit employing three fluidic elements, a monostable switching device 1, a second monostable switching device 2 and a bistable flip-flop 3. The monostable device 1 comprises a power nozzle 4, a right control nozzle or passage 6 and a left control passage 7 as viewed in the FIGURE. The device is also provided with a first or right output passage 8 and a left output passage 9 which communicates with a dump passage 11. The right output passage 8 is connected to a vent 12 and the left output passage is connected to a vent 13. The vent 13 also communicates with the left control passage 7 of the apparatus to introduce the monostable operation. More specifically, the power stream issued by the power nozzle 4 in proceeding through the interaction region of the device towards the output passages 8 and 9, entrains fluid on both sides of the stream. The connection of the left control passage 7 to the vent 13 insures that a larger quantity of entrainment fluid is supplied to the left side of the stream than is supplied to the right side of the stream through the control passage 6. Thus the pressure on the left side of the stream due to entrainment of fluid as the power stream moves between the two walls of the interaction chamber of the device, prevents the pressure on the left side of the stream from dropping as much as on the right side of the stream and the stream normally attaches to the right sidewall and proceeds to the output passage 8.

The output passage 8 of the monostable device 1 proceeds via a channel 14 to an upper control nozzle 16 of the bistable device 3 and via a channel 17 to an upper control nozzle 18 of the monostable device 2. The flip-flop 3 is provided with a lower control nozzle 19 and a power nozzle 21. The device 3 is also provided with an upper output passage 22 and a lower output passage 23 which is connected to a vent or dump 24. The output passages 22 and 23 are provided with vents as is conventional in the art. Output passage 22 of flip-flop 3 is connected via a channel 26 to the input control passage 18 of the device 2 so that the control passage or nozzle 18 of the device 2 is supplied with signals from both of the channels 17 and 26.

The monostable device 2 is provided with a power nozzle 27 and a second or lower control passage 28. There is also provided a lower output passage 29 and an upper output passage 31 both of which are provided with vents 32 and 30 respectively. The vent 32 which connected to the lower output passage 29 is also connected to the control passage 28 of the monostable device 2 to introduce monostability as previously discussed relative to the monostable device 1.

The purpose of the apparatus as previously indicated, is to produce a pulse of a predetermined length upon the application of an input pulse to the apparatus but not to produce a corresponding pulse when the input pulse terminates. In the absence of an input pulse the power stream issued by the power nozzle 4 of the device 1 is directed to the output passage 8 and switches the device 2 such that the power stream is directed to the output channel 29 and switches the device 3 such that the power stream is directed to the output channel 23 and is dumped.

Upon application of an input pulse which is applied to the input control 6 of the device 1, the power stream of the device 1 is directed to the channel 9 and the dump 11. Thus the pressure signal is removed from the channels 14 and 17. There is no response in the device 3 as a result of relief of the input pressure on the control nozzle 16 since it is a bistable device. However, loss of pressurized fluid on the channel 17 and thus at the input control nozzle 18 of the device 2 causes the power stream to switch to the output channel 31 and appear at an output orifice or channel 33 of the apparatus. Concurrently fluid directed to the output channel 31 is directed to a feedback passage 34 and is applied to control nozzle 19 of the flip-flop 3. The power stream of the flip-flop 3 is now directed to its output channel 22 and is applied via the passage 26 to the input control passage 18 of the element 2. The power stream of the element 2 is now switched to its output channel 29 and thus the pressure pulse at the output region 33 is terminated.

When the input pressure signal applied to the control nozzle 6 of the device 1 is terminated, the power stream again switches to the output channel 8 and is directed to the passage 17 maintaining the monostable device 2 with its power stream directed to the passage 29. The element 3 due to pressurized fluid being supplied to the channel 14 and thence to its control nozzle 16 has its power stream switched to the output channel 23 and is dumped. The element 3 is again ready for the next pulse to be applied.

The duration of the input pulse need be only sufficient to permit the element 2 to be reset by a signal appearing in the channel 26. Otherwise if the signal is terminated in a lesser time, the element 2 switches back to the no signal condition, that is, with the power stream directed to the output channel 29 prior to establishment of a pressure of a uniform time duration at the output region 33. It is apparent that the time interval involved is actually the time necessary for the power stream for the element 2 to switch and the effect thereof to be fed back through the channel 34 and the element 3 to the control nozzle 18. The time involved is dependent upon the size of the elements, the length of the circuits, but in no event should be more than a few milliseconds.

It is apparent that the circuit of the present invention achieves its intended results of producing a single pulse at region 33 at the beginning of an input pulse for a specified duration and that no pulse is produced upon termination of the input pulse.

It should also be noted that a signal may be derived from the output passage 29 of element 2 which is the inverse of the signal appearing at the output orifice or region 33. Thus the signal applied to the output passage 29 may be conveyed to an output region 36 which region exhibits a characteristic of a high uniform pressure which upon the application of the input pulse dips to near ambient and in a very short period rises again to the original pressure level. Thus by deriving a signal from either the output region 33 or the output region 36 one may obtain a leading edge positive pulse or a leading edge negative pulse.

The circuit described above is the same as the circuit of the aforesaid copending application, with the addition of the monostable device 1. If the device 1 is eliminated and an input pulse is applied to passages 14 and 17 via a further passage 37, the apparatus becomes a trailing edge shaper.

In the absence of a pulse on the passage 37, the flip-flop 3 feeds passage 26 and the element 2 is maintained in its unstable state with fluid supplied to output region 36. Upon the application of a pulse, flip-flop 3 is reset and the device 2 is maintained in its unstable state by the input pulse. Upon termination of the input pulse, device 2 switches to its stable state establishing a pressure region 33 and concurrently pressurizing channel 34. The flip-flop 3 again switches to supply channel 26 and the element 2 is switched to its unstable state. Thus the shaped pulse is produced at the end of the input pulse and the duration and amplitude of the pulse is the same as in the case of the leading edge pulse.

In the arrangement of the FIGURE, to operate as a trailing edge shaper it is necessary to maintain a positive pressure at all times on the control nozzle 6 of element 1 so as to disable that element. A more conventional arrangement is to connect output passage 8 of element 1 to an output region 38 and break the connection of passage 8 to passage 14. If the device is to operate as a trailing edge shaper, the input pulse is applied to input region 39 connected to passage 37. If the device is to operate as a leading edge shaper the regions 38 and 39 are connected to external means (a jumped hose) and input pulses are applied to nozzle 6 of element 1 via an appropriate input region.

While we have described and illustrated one specific embodiment of our invention, it will be clear that variations of the details of construction which are specifically illustrated and described may be resorted to without departing from the true spirit and scope of the invention as defined in the appended claims.

We claim:

1. A leading edge pulse shaper responsive to a fluid input pulse having a predetermined minimum pulse width for providing a fluid output pulse of lesser width than said input pulse, said pulse shaper comprising:

a. a fluidic switch having a first and a second state;

b. means responsive to an input pulse for causing said fluidic switch to change from said first state to said second state;

c. feedback means responsive to said fluidic switch achieving said second state for returning said fluidic switch to said first state after a predetermined time delay which is shorter than said predetermined minimum pulse width; and d. means responsive to termination of said input pulse for maintaining said fluidic switch in said first state.

2. The combination in accordance with claim 1, wherein said fluidic switch is monostable and said first state is its unstable state.

3. A leading edge pulse shaper comprising:

a fluidic switch having a first and a second state;

means responsive to an input pulse for causing said fluidic switch to change from said first state to said second state;

feedback means responsive to said fluidic switch achieving said second state for returning said fluidic switch to said first state after a predetermined time delay;

means responsive to termination of said input pulse for maintaining said fluidic switch in said first state;

wherein said fluidic switch is monostable and said first state is in its unstable state; and wherein said feedback means comprises: a fluidic bistable device having first and second stable states; means for switching said bistable devices from a first state to a second state in response to said monostable switch obtaining its second state; and means for switching said monostable switch to its unstable state in response to said bistable device achieving its second state.

4. The combination in accordance with claim 3, further comprising means responsive to termination of said input pulse for resetting said bistable device to its said first state.

5. The combination in accordance with claim 4, further comprising:

a. an input fluidic switch having a stable and an unstable state;

b. means for supplying an input control pulse to said input switch to switch it from its stable to its unstable state; and c. said input switch producing a signal when in its stable state for switching said first mentioned fluidic switch and said bistable switch to their first states.

6. A fluidic pulse shaper responsive to an input pulse applied thereto for providing a corresponding output pulse of predetermined pulse width and amplitude, said pulse shaper comprising:

a bistable fluidic element having first and second control ports, a first stable state assumed in response to application of a positive control signal to said first control port, and a second stable state assumed in response to application of a positive control signal to said second control port;

fluidic monostable gating means having control means, a first output passage for providing a fluid signal in the absence of a fluid signal at said control means and a second output passage for providing a fluid signal in the presence of a fluid signal at said control means;

means for substantially simultaneously applying said input pulse to said first of said control ports of said bistable element and said control means of said fluidic gating means;

means for also applying a fluid signal to said control means of said fluidic gating means when said bistable element is in said second stable state; and means for applying said fluid signal appearing on said first output passage to said second control port of said bistable element, said last mentioned means delaying application of said first fluid signal to said control means for a period of time equal to said predetermined pulse width.

7. The fluidic pulse shaper according to claim 6 wherein said last mentioned means comprises a fluid passage having a length which, along with the time required to change states by said bistable element, determines said predetermined pulse width.

8. The combination in accordance with claim 6 wherein said input pulse is a positive pulse.

9. The combination in accordance with claim 6 wherein said input pulse constitutes a decrease in pressure from a normal high level of pressure.

10. A fluidic pulse shaper comprising:

monostable fluidic means, having an input passage and an output passage, for providing substantially zero pressure at said output passage in response to application of a positive pressure at said input passage and for providing a positive pressure signal at said output passage in response to substantially zero pressure at said input passage;

bistable fluidic means, having first and second input passages and at least a first output passage, for providing a positive pressure at said first output passage in response to application of a positive pressure to said first input passage, for maintaining said positive pressure at said first output passage until termination of said positive pressure at said first input passage and application of a positive pressure to said second input passage, for providing substantially zero pressure at said first output passage in response to application of a positive pressure to said second input passage, and for maintaining said substantially zero pressure at said second output passage until termination of said positive pressure at said second input passage and application of said positive pressure to said first input passage;

a first fluid passage interconnecting said first output passage of said bistable means and said input passage of said monostable means;

a second fluid passage interconnecting said output passage of said monostable means and said first input passage of said bistable means; and fluid passage means for receiving input pulses and substantially simultaneously applying said input pulses to said input passage of said monostable means and said second input passage of said bistable means.

11. The fluidic pulse shaper according to claim 10, further comprising further monostable fluidic means, having a further input passage and further output passage, for providing substantially zero pressure at said further output passage in response to application of a positive pressure at said further input passage and for providing a positive pressure at said further output passage in response to substantially zero pressure at said further input passage.

12. A fluidic pulse shaper comprising:

a fluidic switch having first and second states;

a fluidic bistable device having first and second stable states;

input means responsive to a positive pressure input pulse for switching said fluidic switch to its first state and switching said bistable device to its second stable state;

means responsive to said fluidic switch in its first state for switching said bistable device to its first stable state; and means responsive to said bistable device in said first stable state for switching said fluidic switch to its second state.

13. The fluidic pulse shaper according to claim 12 wherein said fluidic switch is a monostable device wherein its first state is stable and its second state is unstable.

14. A leading edge pulse shaper comprising:

a fluidic switch having a stable and an unstable state;

means responsive to an input pulse for switching said fluidic switch from said unstable state to said stable state;

feedback means responsive to said fluidic switch achieving said stable state for switching said fluidic switch to said unstable state after a predetermined time delay; and means responsive to termination of said input pulse for maintaining said fluidic switch in said unstable state.